United States Patent Office 3,112,193
Patented Nov. 26, 1963

3,112,193
PROCESS FOR THE RECOVERY OF MANGANESE COMPOUNDS FROM RHODONITE
Stanley L. Cohen, San Diego, and Chester R. Beam, Richmond, Calif., assignors to American Potash & Chemical Corporation, a corporation of Delaware
No Drawing. Filed Jan. 12, 1959, Ser. No. 786,019
3 Claims. (Cl. 75—1)

This process is concerned with a new and novel method for the recovery of manganese compounds from rhodonite, a manganese silicate ore, in which the manganese is present as $MnSiO_3$. This ore has heretofore not been considered as an economical source of manganese since the cost of recovering the manganese exceeded the selling price.

We have discovered a new and economical method of recovering the manganese values from rhodonite ore. More particularly, we have found that rhodonite ore will decompose successively into tephroite, a manganese-rich silicate of the formula $[(MnO)_2 \cdot SiO_2]$ and, finally, into free manganese oxide and silica. These reactions occur at about 1280° C. and 1330° C., respectively.

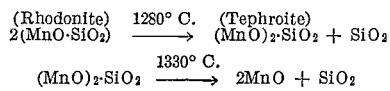

$$\text{(Rhodonite)} \quad 2(MnO \cdot SiO_2) \xrightarrow{1280°\ C.} \text{(Tephroite)} \quad (MnO)_2 \cdot SiO_2 + SiO_2$$

$$(MnO)_2 \cdot SiO_2 \xrightarrow{1330°\ C.} 2MnO + SiO_2$$

If the reaction mass at a temperature in excess of 1330° C. is suddenly quenched in water or some leaching medium, the manganese values are acid soluble, whereas in unroasted rhodonite, little or no manganese can be recovered by a like acid leach.

We have also found that an increase in acid extractable manganese is obtained if silica ($SiO_2$) is added to the rhodonite ore prior to the roasting operation. It is probable that the presence of silica prevents or at least hinders the reverse reactions from taking place upon cooling or quenching of the melt or sinter. However, the addition of silica is not absolutely necessary, particularly if the quenching operation is carried out rapidly after the sintering. We prefer to employ about one-half part of silica per part of rhodonite ore if it is used, but more or less silica can be used depending on the effect desired.

We also usually add from five to ten percent of the ore weight of carbon to maintain a reducing atmosphere in the furnace unless the furnace itself is operated with insufficient combustion air so as to maintain reducing conditions within the furnace. In this latter case, the carbon is not needed.

The length of time that the ore charge remains in the furnace can range from five minutes up to fifteen minutes or more, depending on the temperature. We prefer to use a ten minute retention time at a temperature of 1350° C. to about 1550° C.

If mixtures of rhodonite and silica are used, a slightly higher temperature must be used to obtain a fluid melt that will flow from the furnace. Any of the usual types of regenerative or recuperative open-hearth glass-melting furnaces may be used to carry out this sintering or melting operation as well as the usual type of refractory-insulated rotary cement kiln.

The quenched sinter or melt can be treated with any of the usual mineral acids to render the manganese values water soluble. The acidification of the quenched sinter or melt can be done in an aqueous medium or, alternatively, the quenched material and the desired acid can be mixed together and baked in a rotary kiln at from 200° C. to 500° C. for 0.5 to four hours and then leached with water that has been slightly acidified with the desired acid. A shorter or longer baking time can be used if desired.

We prefer to employ the acid bake procedure and use sulfuric acid as the reacting acid because an acid leach of the quenched material results in the formation of large amounts of gelatinous silica which render subsequent settling and filtration steps very difficult.

After separation of the leach solution from the barren gangue solids, the excess acid present in the solution can be neutralized either by fresh manganous oxide or calcium carbonate or other alkali. If sulfuric acid is used as the leach acid, most of the calcium will be precipitated as calcium sulfate dihydrate (gypsum) and hence will not contaminate the manganese-bearing solution.

Whatever iron, aluminum, and silica remains in solution can be precipitated from solution by neutralization of the leach solution as described above to a pH of 4.5 to 5.5 and then removed by filtration. If any divalent iron is present in the solution, it can be oxidized to the trivalent or ferric state by bubbling air through the solution. It must be realized that there are other equally suitable means of affecting the purification of manganese-bearing solutions than that described above. The method of solution purification described is not to be taken as a limiting feature of this invention. In any case, the purified solution of the manganese salt is then either converted to the solid or, alternatively, used for the production of other manganese chemicals.

The following example further illustrates practice of this invention: 76 parts of a rhodonite ore of the following composition:

|  | Percent |
|---|---|
| Mn | 28.6 |
| $SiO_2$ | 48.1 |
| CaO | 2.8 |
| MgO | 0.4 |
| $Al_2O_3$ | 2.6 |
| $Fe_2O_3$ | 1.7 |
| $Na_2O$ | 0.5 |
| $K_2O$ | 0.2 |
| $CO_2$ | 4.1 | where mixed with 7.6 parts of carbon and 38 parts of silica and fed into a glass melting furnace where it was held at 1350° C. to 1550° C. for about 10 minutes. The melt was then rapidly quenched by pouring it in a small stream into a tank of water. The partially shattered mass was then wet ground to minus 60 mesh and filtered. The moist filter cake was mixed with 60 parts of 96% sulfuric acid and baked in a refractory-lined rotary kiln at 350° C. for two hours. The acid baked ore was then leached with a dilute, slightly acid manganese sulfate solution and the insoluble residue filtered and washed.

The crude manganese sulfate solution was purified by adding calcium carbonate to a pH of 5, and passing in compressed air to oxidize the ferrous to ferric iron. The solution was then filtered to remove a mixture of gypsum, hydrated oxides of iron and aluminum and the silica. The over-all manganese recovery was 77%.

From the foregoing, we believe it will be apparent that we have provided a novel, simple, and improved process for the recovery of manganese compounds from rhodonite. We wish to emphasize that the quick or shock cooling is highly advantageous in that by practicing this step, the compounds present at the temperature of calcination, such as MnO, $SiO_2$ or $(MnO_2) \cdot (SiO_2)$, are preserved in this form and do not revert to rhodonite. If the sinter or melt is cooled slowly, rhodonite is formed, either partially or completely, from the compounds present in the roasting material and the amount of acid-soluble manganese is much less than that obtained when quick-quenching is employed.

We claim:
1. A process for recovering the manganese value from a rhodonite ore in which the manganese is present as $MnSiO_3$ comprising heating a mass of the ore for from about five to about fifteen minutes at a temperature of from about 1330° C. to about 1550° C. under reducing conditions to convert the rhodonite to tephroite [$(MnO)_2 \cdot SiO_2$] and silica and to thereafter decompose the tephroite in the mass to manganese oxide and silica, then quenching the mass with such rapidity from a temperature of at least 1330° C. that the manganese oxide content is solidified as MnO and is free of combined silica, and recovering manganese oxide from the quenched mass.

2. A process for recovering the manganese value from a rhodonite ore in which the manganese is present as $MnSiO_3$ comprising heating a mass of the ore together with a half part of silica for each part of ore for from about five to about fifteen minutes at a temperature of from about 1330° C. to about 1550° C. under reducing conditions to convert the rhodonite to tephroite [$(MnO)_2 \cdot SiO_2$] and silica and to thereafter decompose the tephroite in the mass to manganese oxide and silica, then quenching the mass with such rapidity from a temperature of at least 1330° C. that the manganese oxide content is solidified as MnO and is free of combined silica, and recovering manganese oxide from the quenched mass.

3. A process for recovering the manganese value from a rhodonite ore in which the manganese is present as $MnSiO_3$ comprising heating a mass of the ore together with from about 5% to about 10% by weight of carbon for from about five to about fifteen minutes at a temperature of from about 1330° C. to about 1550° C. under reducing conditions to convert the rhodonite to tephroite [$(MnO)_2 \cdot SiO_2$] and silica and to thereafter decompose the tephroite in the mass to manganese oxide and silica, then quenching the mass with such rapidity from a temperature of at least 1330° C. that the manganese oxide content is solidified as MnO and is free of combined silica, and recovering manganese oxide from the quenched mass.

References Cited in the file of this patent

UNITED STATES PATENTS

| | | |
|---|---|---|
| 505,408 | Moore | Sept. 19, 1893 |
| 1,901,102 | Holt et al. | Mar. 14, 1933 |
| 2,296,841 | Gardner | Sept. 29, 1942 |
| 2,539,485 | Schoenlaub | Jan. 30, 1951 |